United States Patent [19]

Vardi et al.

[11] 4,315,411
[45] Feb. 16, 1982

[54] ALCOHOL TRAP

[75] Inventors: Isaih Vardi, Rehovot; Yigal Kimchi, Ramat Gan; Jonathan Ben-Dror, Hadar Am, all of Israel

[73] Assignee: Tadiran Israel Electronics Industries Ltd., Tel Aviv, Israel

[21] Appl. No.: 150,135

[22] Filed: May 15, 1980

[30] Foreign Application Priority Data

May 16, 1979 [IL] Israel ........................................ 57311

[51] Int. Cl.³ ............................................. F25B 15/00
[52] U.S. Cl. .......................................... 62/112; 62/476
[58] Field of Search ........................... 62/112, 474, 476

[56] References Cited

U.S. PATENT DOCUMENTS

| 3,081,605 | 3/1963 | Leonard, Jr. | 62/112 X |
| 3,177,675 | 4/1965 | Kogel | 62/488 X |
| 3,177,681 | 4/1965 | Phillips et al. | 62/488 X |
| 3,276,217 | 10/1966 | Bourne et al. | 62/112 X |
| 3,289,427 | 12/1966 | Bourne | 62/476 X |
| 3,580,001 | 5/1971 | Eisberg | 62/476 X |
| 3,605,873 | 9/1971 | Leonard, Jr. | 62/476 X |

Primary Examiner—Lloyd L. King
Attorney, Agent, or Firm—Fleit & Jacobson

[57] ABSTRACT

The present invention relates to a chiller of the type using water as refrigerant and aqueous lithium bromide or the like as absorbant, wherein 2-ethyl n-hexanol or a similar compound is used as additive to said solution to improve heat transfer in the absorber, comprising a separator for separating a large part of the additive from said solution, said separator being located between the exit of the lithium bromide solution from the absorber and between the heat exchanger in the conduit leading to the generator. According to one embodiment, the separator operates on gravity separation. According to one embodiment, the separator comprises a vessel large enough for substantially slowing down the velocity of flow of the solution, provided with inlet means at its lower part, outlet means at its upper part for a small part of the solution substantially enriched respective said additive, and an outlet at its lower part for the bulk of the solution, depleted of part of the additive.

3 Claims, 1 Drawing Figure

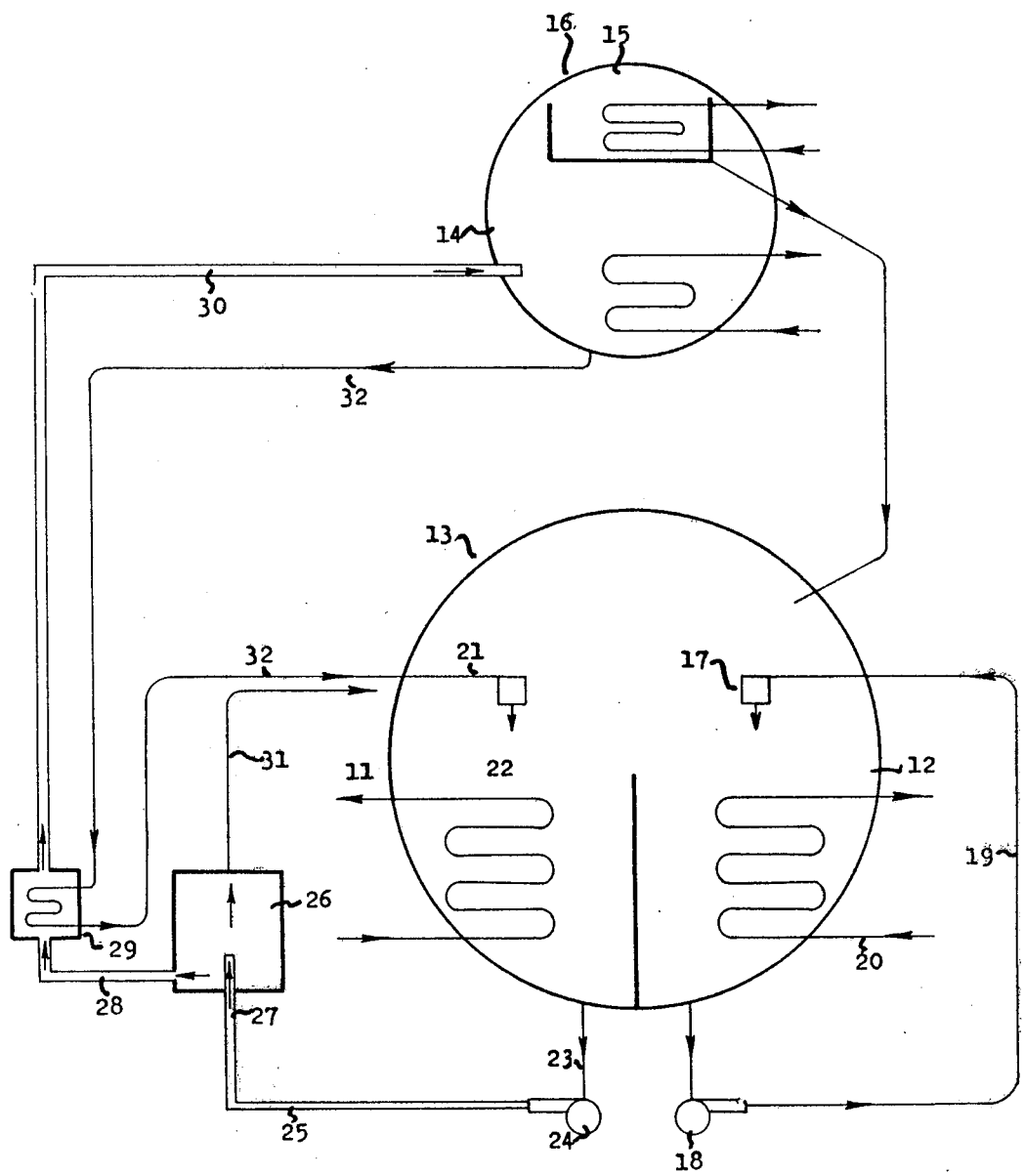

ALCOHOL TRAP

FIELD OF THE INVENTION

The present invention relates to improvements in absorption chillers of the type using water as refrigerant and aqueous lithium bromide or the like as absorbant. Such chillers comprise in combination a generator, a condenser, and evaporator and an absorber. The operating cycle of such chillers is well known and need not be elaborated here.

It is known that the addition of certain additives, and especially of octyl alcohol (2-ethyl n-hexanol) to the aqueous lithium bromide results in improved performance of the chiller. Such improvement may be as high as about 20% respective systems without such additive. The quantities of the additive are comparatively small. Although the mechanism of activity of the additive is not exactly known, it is believed that such additive results in the formation of surface films of the bromide solution on the heat-exchange tubes which provide a better heat exchange than steady state films of such solutions on the tubes. The effect of the addition of such alcohol gradually decreases with time, and it becomes necessary to add further quantities of this additive. It has been found that the additive, which is lighter than the aqueous lithium bromide, tends to accumulate in certain parts of the machine and form a surface layer on top of the aqueous lithium bromide.

The major beneficial effect of the additive is in the absorber where it improves the rate of heat transfer. The additive has also a beneficial effect in the condenser where the heat exchange is also improved. On the other hand, the additive has a deleterious effect in the generator where the rate of heat transfer is reduced, and there is also a less pronounced deleterious effect when such additive is introduced into the evaporator.

From the above it is clear that the additive ought to be present in certain parts of the chiller, whereas in others its concentration ougth to be a minimum.

STATE OF THE PRIOR ART

The beneficial effect of adding octyl alcohol (2-ethyl n-hexanol) to aqueous lithium bromide used in chillers is known. This is also set out in U.S. Pat. Nos. 3,276,217 and 3,289,427.

The cycles set out in the literature and in the said prior patents does not provide means for restricting the presence of the additive to the parts of the chiller where it exerts a beneficial effect.

SUMMARY OF THE INVENTION

The present invention relates to improvements in chillers of the type using water as refrigerant and aqueous lithium bromide or the like as absorbant, octyl alcohol (2-ethyl n-hexanol) or other compound being used as additive which improves the rate of heat exchange, especially in the absorber and to a certain degree also in the condenser. The invention is illustrated with reference to a lithium-bromide/water/octyl alcohol cycle.

According to the present invention there are provided separation means located between the exit of the aqueous lithium bromide solution from the absorber and the point of its introduction into the lithium bromide heat exchanger, conveying the solution into the generator, said separator means resulting in a lithium bromide solution depleted of additive, which is conveyed to the said heat exchanger, and in a lithium bromide solution enriched in additive, which is returned to the absorber. A major part of the additive (2-ethyl n-hexanol) is abstracted from the solution leaving the absorber, and this is recycled to the absorber. According to a preferred embodiment the enriched solution is added to the lithium bromide solution sprayed into the absorber.

The solution containing a small part of the additive is passed via the heat exchanger to the generator and to the condenser, thus improving condenser performance without unduly adversely affecting generator and evaporator performance. In practice as large a part of the additive is abstracted from the solution as is practical. This varies between 20% to about 95% of the original content, and preferably above 50% of the additive is abstracted from the aqueous solution. The depleted solution is passed through the heat exchanger and introduced into the generator.

The octyl alcohol is practically immiscible with water, and forms two phases if left for sufficient time, one of the phases (the heavier one) being aqueous lithium bromide, while the other and lighter one is the octyl alcohol. Accordingly the separator means located between the exit of the solution from the absorber and the entrance into the heat exchanger comprises a suitable chamber provided with inlet means, generally at its lower part, with means for removing the additive or a system highly enriched with additive from the upper part of the chamber and for conveying it to the absorber, means being provided for conveying the depleted lithium bromide solution to the heat exchanger and to the generator.

Generally the quantity of additive is quite small. For about 500 gallons of aqueous lithium bromide (55 to about 58% by weight), a quantity of about 0.5 to 1.0 liters 2-ethyl n-hexanol is sufficient. This quantity improves absorber performance by about 20 percent, and if introduced into the generator it results in a decrease of its performance by a similar rate, i.e. about 20 percent. By substantially depleting the additive content of the lithium bromide solution which is introduced into the generator, the performance of same is not decreases, while the absorber performance is increased as set out above.

The invention is described by way of illustration only with reference to the following detailed description, and to the enclosed schematical drawing in which:

The FIGURE is a schematical elevational view, not according to scale, of an absorption chiller, with additive separator means according to the invention.

DESCRIPTION OF THE PREFERRED EMBODIMENT

As shown in the FIGURE, the chiller according to the present invention comprises in combination an absorber 11 and an evaporator 12 positioned in housing 13, a generator 14 and a condenser 15 located in housing 16, means being provided for circulating aqueous lithium bromide through this system. The two housings are maintained at reduced pressure. Water is introduced into the evaporator 12 via nozzles 17, and pumped via pump 18 through conduit 19 to said nozzles 17. Water chilled in the absorber is passed through tubings 20 to the outside. Concentrated aqueous lithium bromide is sprayed into the absorber 11 by means of nozzles 21, the spray passes over the tubings 22 which circulate cold water. Aqueous lithium bromide is removed from the bottom of the absorber 11 via conduit 23 and pumped by pump 24 via conduit 25 to the separator 26, entering via entrance 27, the solution being depleted by gravity separation, the depleted solution leaving via conduit 28 to the heat exchanger 29 and from same via conduit 30 to the generator 14, whereas the lithium bromide solution substantially enriched in additive is reintroduced into absorber 11 via conduit 31. Advantageously the 2-ethyl n-hexyl alcohol is inserted into conduit 32 which conveys lithium bromide from generator 14 via heat exchanger 29 to the spray nozzles 21 in absorber 11.

The result is that the lithium bromide solution sprayed into absorber 11 via nozzles 21 contains an adequate quantity of additive, whereas the solution conveyed to generator 14 contains a much smaller percentage of this additive, which solution is concentrated and recirculated to the absorber.

In an actual experiment lithium bromide solution containing about 56% by weight lithium bromide and about 0.8% by weight 2-ethyl n-hexanol, at about 30° C. was removed from the bottom of the absorber and introduced at a flow rate of about 20 gallon/minute into the separator volume where the velocity of flow was substantially decreased due to the large volume of the separator. The 2-ethyl n-hexanol was separated by gravity separation and only about 20% of its was passed to the heat exchanger, while about 80% was removed at the top of the separator and recycled to the absorber. The ratio of quantities of solution flowing to the heat exchanger and to the absorber was about 20:1 i.e. about 19 gallons/minute to 1 gallon per minute. The 1 gallon contained was 4 times the quantity of additive contained in the larger quantity conveyed to the heat exchanger.

It is clear that the above description is by way of example only and that various changes and modifications of components and arrangements of parts may be resorted to without departing from the scope and spirit of the present invention.

We claim:

1. A process for operating the refrigeration cycle of a chiller of the type using water as a refrigerant and lithium bromide or the like as an absorbant and 2ethyl n-hexanol as an additive, comprising the steps of:
   removing an aqueous lithium bromide solution containing 2-ethyl n-hexanol from an absorber;
   continuously separating the solution into a hexanol depleted phase and a hexanol enriched phase;
   recycling the enriched phase to the absorber; and
   feeding the alcohol depleted phase through a heat exchange means to a generator, said depleted phase being in heat exchanger relationship with lithium bromide fed from the generator to said absorber through said heat exchange means.

2. The process of claim 1, wherein the separation is conducted in a gravity separator comprising a vessel sufficiently large to substantially reduce the velocity of the flow of the solution removed from the absorber.

3. The process of claim 1, wherein between 10 to 95 weight % of the hexanol is removed from the solution.

* * * * *